(No Model.)
A. L. STEVENS & A. B. HAMPTON
Animal Trap.
No. 233,123. Patented Oct. 12, 1880.
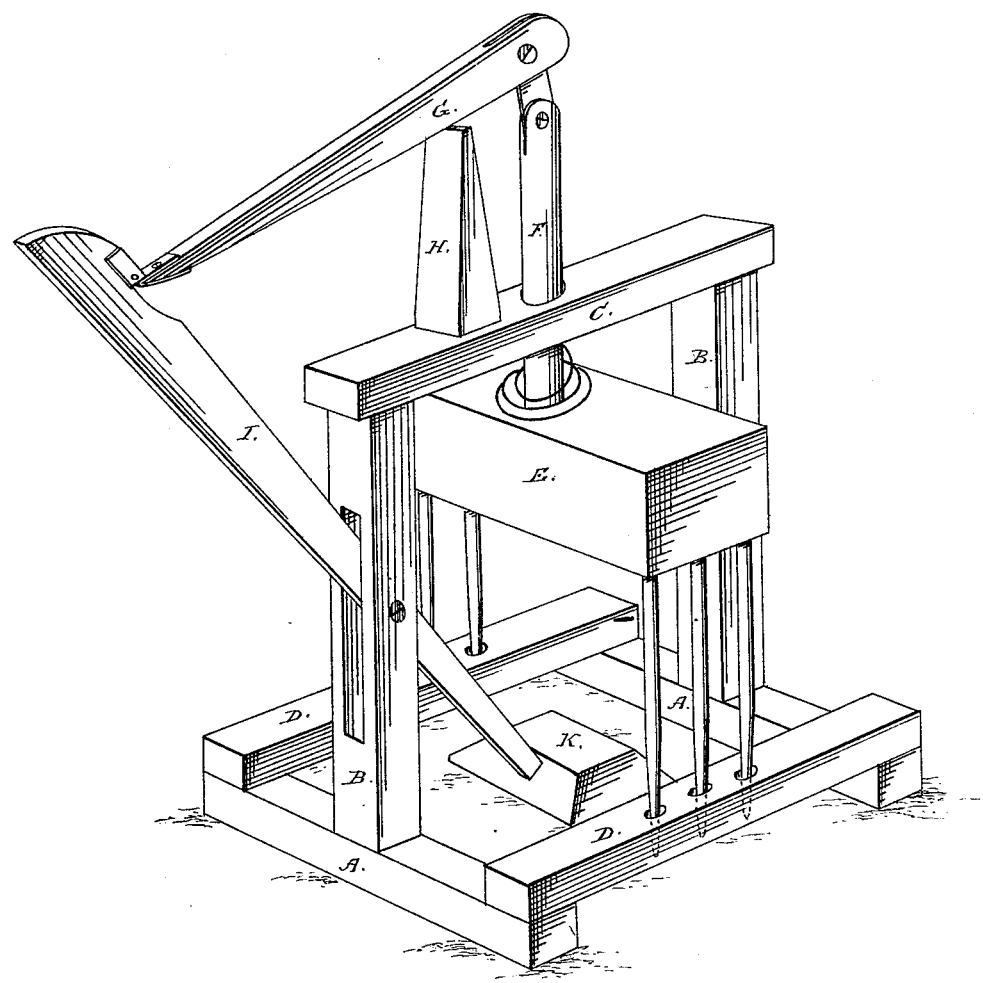

UNITED STATES PATENT OFFICE.

ALBERT L. STEVENS AND ANDREW B. HAMPTON, OF HANSON STATION, KY.

ANIMAL-TRAP.

SPECIFICATION forming part of Letters Patent No. 233,123, dated October 12, 1880.

Application filed April 13, 1880. (No model.)

*To all whom it may concern:*

Be it known that we, ALBERT L. STEVENS, of Hanson Station, in the county of Hopkins and State of Kentucky, and ANDREW B. HAMPTON, of Hanson Station, in the county of Hopkins and State of Kentucky, have invented a new and useful Improvement in Mole-Traps; and we do hereby declare that the following is a full and exact description of the same, reference being had to the accompanying drawing, and to the letters of reference marked thereon.

Our invention relates to that class of mole-traps which is provided with a drop-beam or dead-fall, having projecting spikes for catching the animal by impaling; and the invention therein consists in the peculiar construction, arrangement, and combination of its operative parts, as more fully hereinafter described.

To enable others skilled in the art to make and use our device, we will now fully describe its construction and operation.

In the drawing, which is a perspective view of our trap set for use, A A represent two sills or beams which support the frame-work of the trap. B B represent vertical standards rising from these sills on either side. These standards are properly secured at their lower ends to the centers of the sills, while their upper ends are united to a cross-bar, C, in a similar manner.

D D represent cross-beams of the same length as and resting upon the sills A A, flush with their ends and sides, to which they are secured in any strong and convenient way. These cross-beams serve to strengthen the frame, and also to guide the spikes of the dead-fall in their vertical movement.

E represents the drop-beam or dead-fall, provided with a single row of three or more downwardly-projecting spikes at each end, and having also at its center a shaft or standard, F, rising vertically through a suitable orifice in the cross-bar C. Around this shaft, between the dead-fall and cross-bar, is placed a coil-spring of stout heavy wire for operating the drop-beam or dead-fall.

G represents a lever, with one of its ends free and the other connected with the shaft F by means of a thin iron plate fitting into scarfs made in the ends of the shaft and lever, in which it is suitably secured by screws, so as to have a free-and-easy movement in the direction of the length of the cross-bar.

H represents a fulcrum rising from the cross-bar C, as shown, to operate the free end of the lever upon when setting the trap, and is wedge shape in form.

I represents the lever-trigger, and is a long arm extending upward from the treadle or base-plate K, to which it is firmly secured transversely through a slot in one of the vertical standards, where it is pivoted, a little below its center, a sufficient distance above the cross-bar to allow the free end of the lever to engage in a notch on the inside of its upper end when setting the trap. The free end of the lever tapers to a point, which is shod with iron or brass. The notch in the lever-trigger is also covered in a similar way.

The treadle K is so adjusted upon the end of the lever-trigger as to have its under surface in the same plane as that of the sills A A when the trap is set for use.

The manner of setting and operating our device is as follows: After pressing the earth down so as to close the passway of the mole, the sills of the trap are placed on each side of the passway, the under surface of the treadle resting upon the pressed earth directly over said passway. Then openings for the spikes are made by pressing the spikes down their full length into the ground before setting the trap. The trap is then set by bearing the free end of lever G down upon its fulcrum H until the iron-shod point engages in the notch of the lever-trigger I. By this means the dead-fall is raised toward the cross-bar, compressing the spring in its upward movement against the same, and when a sufficient distance in height is reached it is held up until the treadle K is elevated by the mole while attempting to pass, when the upward pressure upon the treadle forces the lever-trigger I up and outward, disengages the lever G, and the spring, now released, operates to drive the dead-fall down with great and sudden velocity.

The advantages in a trap of this construction and arrangement are readily perceived by any person observing its operation—viz., that it is simple in construction and not easy to get out of repair; that by the arrangement of its operative parts it can be set with little or no trouble; that its operation is quick and effective, and that it can be placed upon the market at such a reasonable price that it can be purchased by all in need of such devices for exterminating moles.

We are aware that a patent has been granted for an impalement-trap wherein a lever attached to the dead-fall and passing through a pivotal bearing on the top of the frame-work engages with the free end of a lever-trigger lying in the same plane as and pivoted to the base of the trap, and wherein a trippet, attached to the lever near its engaging end, is employed in conjunction with the lever-trigger to spring the trap, and we do not claim anything therein described for the operation of our device. The trippet is not needed, the peculiar construction and arrangement of our lever and lever-trigger enabling the trap to be operated in a much more simple and effective manner.

What we claim is—

1. In a mole-trap, the combination, with the lever-trigger I, having its upper end notched and extending transversely through a slot in the standard B, and connecting with the treadle K, of the lever G, fulcrum H, vertical standard F, and the dead-fall E, actuated by a spring secured around said standard, the several parts constructed, arranged, and operating substantially as described and shown.

2. In a mole-trap, the combination, with the dead-fall E and its vertical standard F, of the lever G and its fulcrum H, said lever being hinged to the vertical standard, as shown, and operating to raise the dead-fall, substantially as described.

This specification signed and witnessed this 5th day of April, 1880.

ALBERT L. STEVENS.
   ANDREW B. HAMPTON.

Witnesses:
 ROBERT W. ASHBY,
 WILEY A. MITCHELL.